(12) United States Patent
Pasquero et al.

(10) Patent No.: US 8,849,845 B2
(45) Date of Patent: Sep. 30, 2014

(54) SYSTEM AND METHOD FOR DISPLAYING SEARCH RESULTS ON ELECTRONIC DEVICES

(75) Inventors: Jerome Pasquero, Waterloo (CA); Steven Fyke, Waterloo (CA)

(73) Assignee: BlackBerry Limited (CA)

( * ) Notice: Subject to any disclaimer, the term of this patent is extended or adjusted under 35 U.S.C. 154(b) by 257 days.

(21) Appl. No.: 12/938,816

(22) Filed: Nov. 3, 2010

(65) Prior Publication Data

US 2012/0109923 A1    May 3, 2012

(51) Int. Cl.
 *G06F 17/30* (2006.01)
 *G06F 3/01* (2006.01)

(52) U.S. Cl.
 CPC .......... *G06F 17/30994* (2013.01); *G06F 3/013* (2013.01); *G06F 17/30864* (2013.01)
 USPC .......................................... 707/765; 707/706

(58) Field of Classification Search
 CPC .................... G06F 17/30017; G06F 17/30058; G06F 17/30265
 USPC .......... 707/769, 780, 765, 752, 754, 999.003, 707/999.004, 999.005, E17.082, 912–915, 707/E17.108, 706; 715/210, 968, 790; 382/229, 317
 See application file for complete search history.

(56) References Cited

U.S. PATENT DOCUMENTS

| | | | |
|---|---|---|---|
| 5,638,176 A | 6/1997 | Hobbs et al. | |
| 5,886,683 A | 3/1999 | Tognazzini et al. | |
| 6,393,136 B1 | 5/2002 | Amir et al. | |
| 6,532,298 B1 | 3/2003 | Cambier et al. | |
| 6,539,100 B1 | 3/2003 | Amir et al. | |
| 6,758,563 B2 | 7/2004 | Levola | |
| 7,027,619 B2 | 4/2006 | Pavlidis et al. | |
| 7,046,924 B2 | 5/2006 | Miller et al. | |
| 7,206,022 B2 | 4/2007 | Miller et al. | |
| 7,313,621 B2 | 12/2007 | Gudorf et al. | |

(Continued)

FOREIGN PATENT DOCUMENTS

| | | |
|---|---|---|
| EP | 1213642 A1 | 6/2002 |
| EP | 1679577 A1 | 12/2006 |

OTHER PUBLICATIONS

Eye-tracking studies: more than meets the eye; pp. 1 to 4; http://googleblog.blogspot.com/2009/02/eve-tracking-studies-more-than-meets.html.

(Continued)

*Primary Examiner* — Greta Robinson
(74) *Attorney, Agent, or Firm* — Brett J. Slaney; Blake, Cassels & Graydon LLP

(57) ABSTRACT

A system and method are provided for displaying search results on an electronic device. The method includes: displaying at least a portion of a first set of search results; capturing one or more images using a camera device of the electronic device, the camera device being directed in a same direction as a display of the electronic device, the image comprising one or more subjects; determining corresponding points of regard in the one or more images for at least one of the one or more subjects, the points of regard being indicative of areas on the display at which a gaze of the corresponding subject is directed; determining one or more search results associated with the points of regard; and displaying further search results based on information associated with the one or more search results associated with the points of regard.

18 Claims, 15 Drawing Sheets

(56) References Cited

U.S. PATENT DOCUMENTS

| | | |
|---|---|---|
| 7,359,567 B2 | 4/2008 | Gomi et al. |
| 7,440,592 B1 | 10/2008 | Nimmer |
| 7,460,940 B2 | 12/2008 | Larsson et al. |
| 7,591,558 B2 | 9/2009 | Wezowski et al. |
| 7,630,524 B2 | 12/2009 | Lauper et al. |
| 7,643,659 B2 | 1/2010 | Cao et al. |
| 7,676,063 B2 | 3/2010 | Cohen et al. |
| 7,705,877 B2 | 4/2010 | Jackson |
| 2002/0103625 A1* | 8/2002 | Card et al. .............. 702/187 |
| 2006/0002607 A1* | 1/2006 | Boncyk et al. .............. 382/165 |
| 2006/0109237 A1 | 5/2006 | Morita et al. |
| 2006/0265435 A1 | 11/2006 | Denissov |
| 2007/0156647 A1 | 7/2007 | Shen et al. |
| 2007/0174243 A1* | 7/2007 | Fritz .............................. 707/3 |
| 2009/0077065 A1 | 3/2009 | Song et al. |
| 2010/0191727 A1 | 7/2010 | Malik |
| 2010/0321482 A1* | 12/2010 | Cleveland ...................... 348/78 |
| 2010/0328444 A1* | 12/2010 | Blixt et al. ...................... 348/78 |
| 2011/0191356 A1* | 8/2011 | Gazula .......................... 707/752 |
| 2011/0314049 A1* | 12/2011 | Poirier et al. .................. 707/769 |

OTHER PUBLICATIONS

Buscher, G. et al.; "What Do You See When You're Surfing? Using Eye Tracking to Predict Salient Regions of Web Pages"; CHI 2009; Apr. 2009; Boston, U.S.A.; http://research.microsoft.com/en-us/um/people/cutrell/chi09-buschercutrellmorriseyetrackingforwebsalience.pdf.

Advanced Eye Project; Dec. 1999; http://evetracking.stanford.edu/.

Abbing, Ralf; Search Report from corresponding European Application No. 10189874.0; search completed Mar. 16, 2011.

http://www.youtube.com/watch?v=w29DrEEsqT4 : Example of Eye-Tracking on Universal Search; available on the internet as early as Feb. 9, 2009; retrieved from the internet Oct. 1, 2012.

* cited by examiner

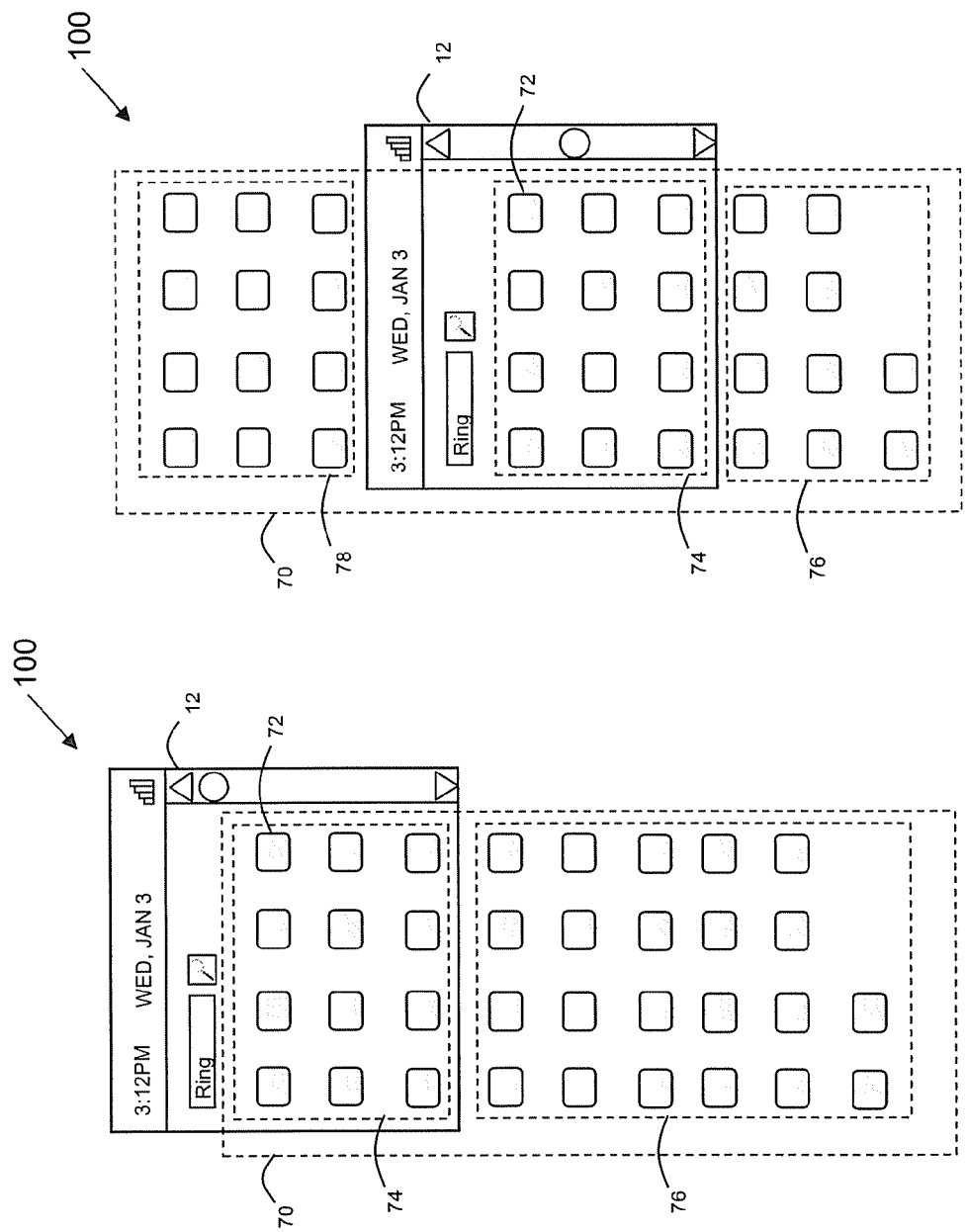

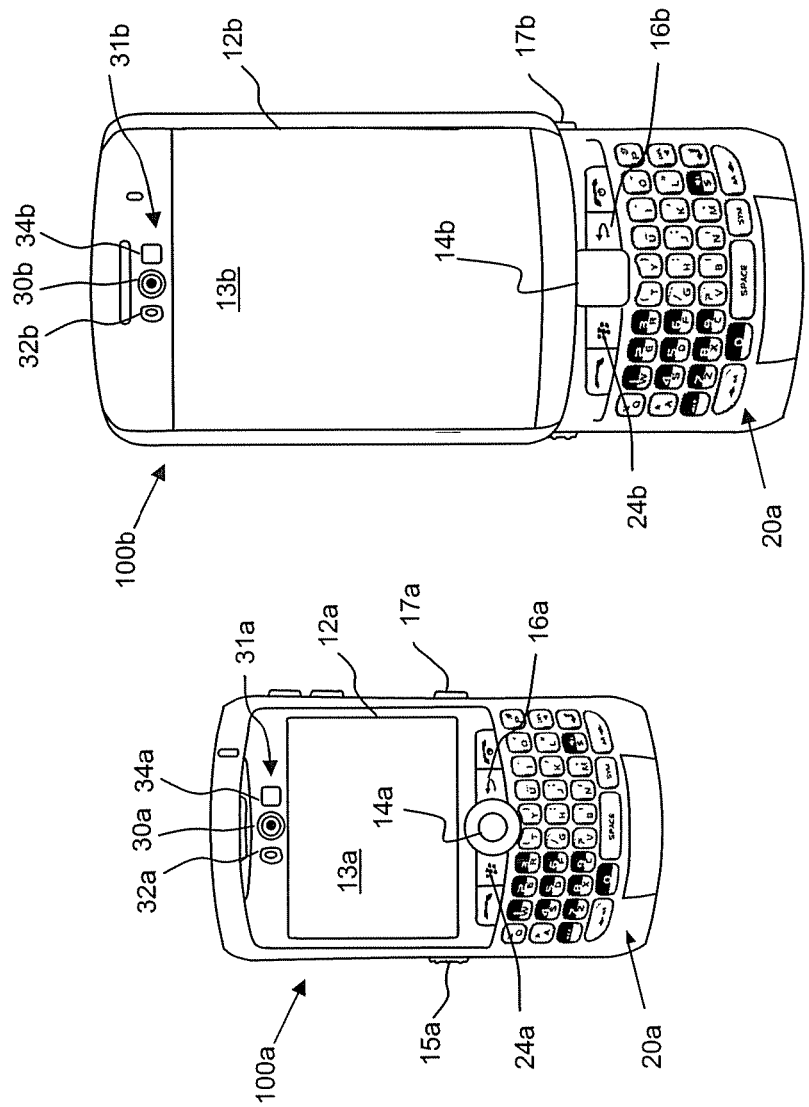

US 8,849,845 B2

SYSTEM AND METHOD FOR DISPLAYING SEARCH RESULTS ON ELECTRONIC DEVICES

TECHNICAL FIELD

The following relates generally to displaying search results on electronic devices.

DESCRIPTION OF THE RELATED ART

Many electronic devices, including mobile devices, can run search tools to provide information that relates to or satisfies a user specified search criteria. For example, a search application may find e-mail messages from a specific sender and present them to the user in the form of a list of e-mails. In another example, the device may access an internet-based search engine through a web-browser to find websites related to a keyword provided by the user, and present the results to the user in the form of a list of website links.

In many searches, the number of results from the search will be greater than the number of results that can be shown on the display. This is particularly applicable for a mobile device, partly because the size of the display can be limited. As a result, the list of results may be displayed in parts. For example, the list of results may be divided into a number of pages, each page displaying a part of the list of results. In another example, the display can show a part of the list of results and the associated user interface can enable the user to scroll up and down the list of results in order to show the remaining parts.

BRIEF DESCRIPTION OF THE DRAWINGS

Embodiments will now be described by way of example only with reference to the appended drawings wherein:

FIG. 1 is a schematic diagram of the display of a mobile device showing a part of an example list of results.

FIG. 2 is schematic diagram of the display of a mobile device showing another part of the example list of results of FIG. 1.

FIG. 4 is a plan view of an example mobile device and a display screen therefor.

FIG. 5 is a plan view of another example mobile device and a display screen therefor.

DETAILED DESCRIPTION

Figure 3:
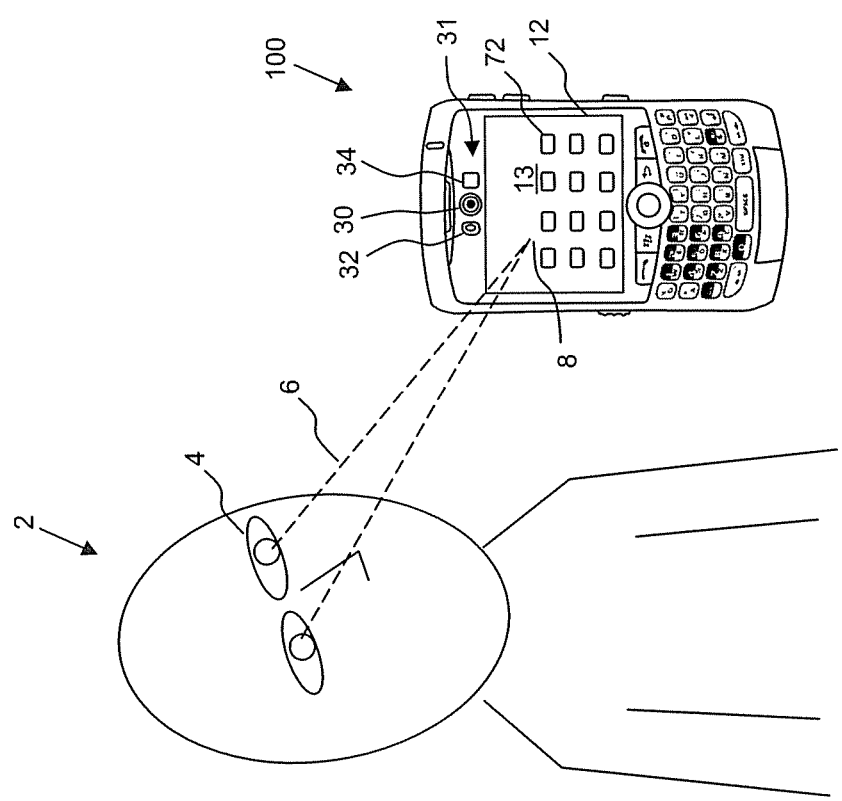
FIG. 3 is a schematic diagram of a user viewing the display of a mobile device.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practised without these specific details. In other instances, well-known methods, procedures and components have not been described in detail so as not to obscure the example embodiments described herein. Also, the description is not to be considered as limiting the scope of the example embodiments described herein.

Many search tools present the results of a search in the form of a list having a specific order. The order of the results within the list can be based on the relevancy of a result to the search criteria (as determined by the search tool), or this order may be set by the user based on one or more parameters (e.g. date, file size, etc.). Under certain circumstances, the list of results may not place the results of most interest to the user at or near the top of the list. Such circumstances can occur, for example, if the search criteria are quite broad so as to capture a wide range of results. The inclusion of results that the user may not be interested in, and the fact that the number of results can be large, can make it difficult for a user to locate the results of interest in a list of search results.

It has been recognized that methods for displaying search results on an electronic device such as a mobile device are typically limited in their ability to determine the results of most interest to the user, and thus do not place such results near or at the top of the list of results. To address this, the following describes a method, computer readable storage medium and mobile device operable to display search results. The method includes: displaying at least a portion of a first set of search results; capturing one or more images using a camera device of the mobile device, the camera device being directed in a same direction as a display of the mobile device, the image comprising one or more subjects; determining corresponding points of regard in the one or more images for at least one of the one or more subjects, the points of regard being indicative of areas on the display at which a gaze of the corresponding subject is directed; determining one or more search results associated with the points of regard; and displaying further search results based on information associated with the one or more search results associated with the points of regard.

Turning to FIG. 1, a schematic diagram of a display 12 of a mobile device 100 displaying an example set search results is provided. The search results are, in this example embodiment, in the form of a set of results 70. The set of results 70 is made up of one or more individual results 72. The display 12 is showing a portion of the set of results 70. The set of individual results 72 shown on the display 12 may be referred to as the displayed results 74. The set of individual results 72 not yet shown on the display 12 may be referred to as a set or collection of upcoming results 76. In FIG. 2, the display 12 has scrolled down the set of results 70 to show a next set of displayed results 74 and this next set of displayed results 74 is moved from the set of upcoming results 76 into the foreground. The set of individual results 72 previously shown on the display 12 may now be referred to as previously displayed results 78.

It can be appreciated that the set of search results should not be limited to the form of a grid or array of results 70 as shown by way of example in FIGS. 1 and 2. For example, the search results may be represented in any suitable form such as a single columnar list, wherein each search result includes a row or entry in the list. It can be further appreciated that each result 72 can display any form of information suitable for representing the results 72, such as website addresses or links, images, videos, filenames, etc. For the sake of clarity, the search results will hereinafter be commonly referred to as a set of results 70, and when specified, each result 72 will be in the form of data such as an image with associated metadata, and the principles described herein are applicable to any form of data that can represent or otherwise identify or indicate a respective search result.

Turning to FIG. 3, a schematic diagram of a user 2 viewing a display 12 of a mobile device 100 is provided. In this example embodiment, the mobile device 100 is situated in front of the user 2. The user 2 has a pair of eyes 4 that have associated therewith, a gaze direction 6 (i.e. the direction towards which the user is looking), and a point of regard 8 (i.e. an area at which the user is looking). In this example embodiment, the gaze direction 6 is towards the display 12, and the point of regard 8 falls on a viewing area 13 provided thereby. The mobile device 100 also has a front or forward-facing camera lens 30, a light source 32, and a distance sensor 34, collectively referred to as a camera device 31. The front camera lens 30, light source 32, and distance sensor 34 can be used to track the gaze direction 6 and point of regard 8 of the user 2. The point of regard 8 can be used to infer what the user 2 is interested in on the display 12. For example, if the point of regard 8 is fixed on a result 72, it can be inferred that the user 2 has an interest in that result 72.

Examples of applicable mobile electronic devices include pagers, cellular phones, cellular smart-phones, wireless organizers, personal digital assistants, computers, laptops, handheld wireless communication devices, wirelessly enabled notebook computers, camera devices, tablet computers, and the like. Such devices will hereinafter be commonly referred to as "mobile devices" 100 for the sake of clarity. It will however be appreciated that the principles described herein are also suitable to other electronic devices, e.g. "non-mobile" devices. For example, the principles herein are equally applicable to personal computers (PCs), tabletop computing devices, wall-mounted screens such as kiosks, or any other computing device that includes a camera device and display.

In an example embodiment, the mobile device 100 can be a two-way communication device with advanced data communication capabilities including the capability to communicate with other mobile devices or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, or a data communication device (with or without telephony capabilities).

Referring to FIGS. 4 and 5, one example embodiment of a mobile device 100a is shown in FIG. 4, and another example embodiment of a mobile device 100b is shown in FIG. 5. It will be appreciated that the numeral "100" will hereinafter refer to any mobile device 100, including the example embodiments 100a and 100b, those example embodiments enumerated above or otherwise. It will also be appreciated that a similar numbering convention may be used for other general features common between all figures such as a display 12, a positioning device 14, a cancel or escape button 16, a camera button 17, and a menu or option button 24.

The mobile device 100a shown in FIG. 4 includes a display 12a with a viewing area 13a and the cursor or view positioning device 14 shown in this example embodiment is a trackball 14a. Positioning device 14 may serve as another input member and is both rotational to provide selection inputs to the main processor 102 (see FIG. 6) and can also be pressed in a direction generally toward housing to provide another selection input to the processor 102. Trackball 14a permits multi-directional positioning of the selection cursor 18 (see FIG. 7) such that the selection cursor 18 can be moved in an upward direction, in a downward direction and, if desired and/or permitted, in any diagonal direction. The trackball 14a is in this example embodiment situated on the front face of a housing for mobile device 100a as shown in FIG. 4 to enable a user to manoeuvre the trackball 14a while holding the mobile device 100a in one hand. The trackball 14a may serve as another input member (in addition to a directional or positioning member) to provide selection inputs to the processor 102 and can preferably be pressed in a direction towards the housing of the mobile device 100b to provide such a selection input. It can be appreciated that the trackball 14a is only one example embodiment of a suitable positioning device 14. For example, a trackpad, touchscreen, OLED, or other input mechanism may equally apply.

The display 12 may include a selection cursor 18 that depicts generally where the next input or selection will be received. The selection cursor 18 may include a box, alteration of an icon or any combination of features that enable the user to identify the currently chosen icon or item. The mobile device 100a in FIG. 4 also includes a programmable convenience button 15a to activate a selected application such as, for example, a calendar or calculator. Further, mobile device 100a includes an escape or cancel button 16a, a camera button 17a, a menu or option button 24a and a keyboard 20a. The camera button 17a is able to activate photo and video capturing functions, e.g. when pressed in a direction towards the housing. The menu or option button 24a can be used to load a menu or list of options on the display 12a when pressed. In this example embodiment, the escape or cancel button 16a, the menu option button 24a, and a keyboard 20a are disposed on the front face of the mobile device housing, while the convenience button 15a and camera button 17a are disposed at the side of the housing. This button placement enables a user to operate these buttons while holding the mobile device 100 in one hand. The keyboard 20a is, in this example embodiment, a standard QWERTY keyboard, however, it will be appreciated that reduced QWERTY or virtual keyboards (e.g. as provided by a touchscreen) may equally apply The mobile device 100a also has a front camera lens 30a, a light source 32a and a distance sensor 34a, collectively referred to as a camera device 31a. The light source 32a may be used to illuminate an object (e.g. user 2) for capturing an image such as a photo, or a collection of images such as a video. The front camera lens 32a allows the light that represents an image to enter into the camera device 31a. The camera device 31a may be activated by pressing the camera button 17a. The distance sensor 34a measures or determines the distance between the front camera lens 32a and an object in the image captured by the camera device 31a.

The mobile device 100b shown in FIG. 5 includes a touch-screen display 12b with a viewing area 13b and the positioning device 14 in this example embodiment is a trackpad 14b. The mobile device 100b also includes a menu or option button 24b, a cancel or escape button 16b, a camera button 17b, a convenience button 15b, a front camera lens 30b, a light source 32b and a distance sensor 34b. The front camera lens 30b, light source 32b and distance sensor 34b are collectively referred to as a camera device 31b. The mobile device 100b, as illustrated in FIG. 5, includes a standard reduced QWERTY keyboard 20b. In this example embodiment, the keyboard 20b, positioning device 14b, escape button 16b and menu button 24b are disposed on a front face of a mobile device housing.

It will be appreciated that for the mobile device 100, a wide range of one or more positioning or cursor/view positioning mechanisms such as a touch/track pad, a positioning wheel, a joystick button, a mouse, a touchscreen, a set of arrow keys, a tablet, an accelerometer (for sensing orientation and/or movements of the mobile device 100 etc.), OLED, or other whether presently known or unknown may be employed. Similarly, any variation of keyboard 20 may be used. It will also be appreciated that the mobile devices 100 shown in FIGS. 4 and 5 are for illustrative purposes only and various other mobile devices 100 are equally applicable to the following example embodiments. Other buttons may also be disposed on the mobile device housing such as colour coded "Answer" and "Ignore" buttons to be used in telephonic communications. In another example embodiment, the display 12 may itself be touch sensitive thus itself providing an input mechanism in addition to display capabilities.

To aid the reader in understanding the structure of the mobile device 100, reference will now be made to FIGS. 6 through 8.

Figure 6:
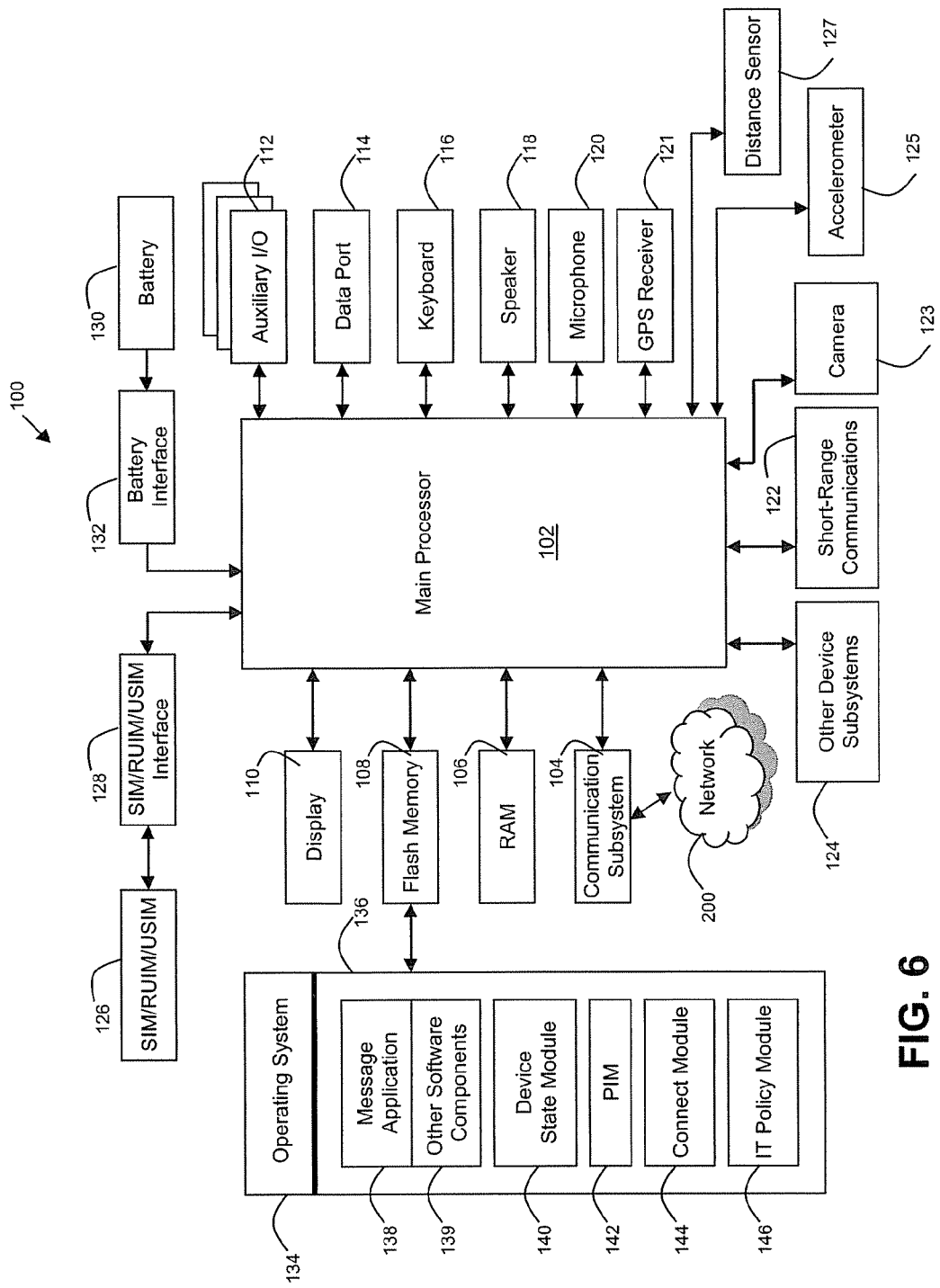
FIG. 6 is a block diagram of an example embodiment of a mobile device.

Referring first to FIG. 6, shown therein is a block diagram of an example embodiment of a mobile device 100. The mobile device 100 includes a number of components such as a main processor 102 that controls the overall operation of the mobile device 100. Communication functions, including data and voice communications, are performed through a communication subsystem 104. The communication subsystem 104 receives messages from and sends messages to a wireless network 200. In this example embodiment of the mobile device 100, the communication subsystem 104 is configured in accordance with the Global System for Mobile Communication (GSM) and General Packet Radio Services (GPRS) standards, which is used worldwide. Other communication configurations that are equally applicable are the 3G and 4G networks such as EDGE. UMTS and HSDPA, LTE, \8/i-Max etc. New standards are still being defined, but it is believed that they will have similarities to the network behaviour described herein, and it will also be understood by persons skilled in the art that the example embodiments described herein are intended to use any other suitable standards that are developed in the future. The wireless link connecting the communication subsystem 104 with the wireless network 200 represents one or more different Radio Frequency (RF) channels, operating according to defined protocols specified for GSM/GPRS communications.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, a GPS receiver 121, short-range communications 122, a camera 123, a accelerometer 125, a distance sensor 127 and other device subsystems 124. The display 110 can be a touch-screen display able to receive inputs through a user's touch.

Some of the subsystems of the mobile device 100 perform communication-related functions, whereas other subsystems may provide "resident" or on-device functions. By way of example, the display 110 and the keyboard 116 may be used for both communication- elated functions, such as entering a text message for transmission over the network 200, and device-resident functions such as a calculator or task list.

The mobile device 100 can send and receive communication signals over the wireless network 200 after required network registration or activation procedures have been completed. Network access is associated with a subscriber or user of the mobile device 100. To identify a subscriber, the mobile device 100 may use a subscriber module component or "smart card" 126, such as a Subscriber Identity Module (SIM), a Removable User Identity Module (RUIM) and a Universal Subscriber Identity Module (USIM). In the example embodiment shown, a SIM/RUIM/USIM 126 is to be inserted into a SIM/RUIM/USIM interface 128 in order to communicate with a network. Without the component 126, the mobile device 100 is not fully operational for communication with the wireless network 200. Once the SIM/RUIM/USIM 126 is inserted into the SIM/RUIM/USIM interface 128, it is coupled to the main processor 102.

The mobile device 100 is typically a battery-powered device and includes a battery interface 132 for receiving one or more rechargeable batteries 130. In at least some example embodiments, the battery 130 can be a smart battery with an embedded microprocessor. The battery interface 132 is coupled to a regulator (not shown), which assists the battery 130 in providing power to the mobile device 100. Although current technology makes use of a battery, future technologies such as micro fuel cells may provide the power to the mobile device 100.

The mobile device 100 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, may be installed on the mobile device 100 during its manufacture. Software applications may include a message application 138, a device state module 140, a Personal Information Manager (PIM) 142, a connect module 144 and an IT policy module 146. A message application 138 can be any suitable software program that allows a user of the mobile device 100 to send and receive electronic messages, wherein messages are typically stored in the flash memory 108 of the mobile device 100. A device state module 140 provides persistence, i.e. the device state module 140 ensures that important device data is stored in persistent memory, such as the flash memory 108, so that the data is not lost when the mobile device 100 is turned off or loses power. A PIM 142 includes functionality for organizing and managing data items of interest to the user, such as, but not limited to, e-mail, contacts, calendar events, and voice mails, and may interact with the wireless network 200. A connect module 144 implements the communication protocols that are required for the mobile device 100 to communicate with the wireless infrastructure and any host system, such as an enterprise system, that the mobile device 100 is authorized to interface with. An IT policy module 146 receives IT policy data that encodes the IT policy, and may be responsible for organizing and securing rules such as the "Set Maximum Password Attempts" IT policy.

Other types of software applications or components 139 can also be installed on the mobile device 100. These software applications 139 can be pre-installed applications (i.e. other than message application 138) or third party applications, which are added after the manufacture of the mobile device 100. Examples of third party applications include games, calculators, utilities, etc.

The additional applications 139 can be loaded onto the mobile device 100 through at least one of the wireless network 200, the auxiliary I/O subsystem 112, the data port 114, the short-range communications subsystem 122, or any other suitable device subsystem 124.

The data port 114 can be any suitable port that enables data communication between the mobile device 100 and another computing device. The data port 114 can be a serial or a parallel port. In some instances, the data port 114 can be a USB port that includes data lines for data transfer and a supply line that can provide a charging current to charge the battery 130 of the mobile device 100.

For voice communications, received signals are output to the speaker 118, and signals for transmission are generated by the microphone 120. Although voice or audio signal output is accomplished primarily through the speaker 118, the display 110 can also be used to provide additional information such as the identity of a calling party, duration of a voice call, or other voice call related information.

Figure 7:
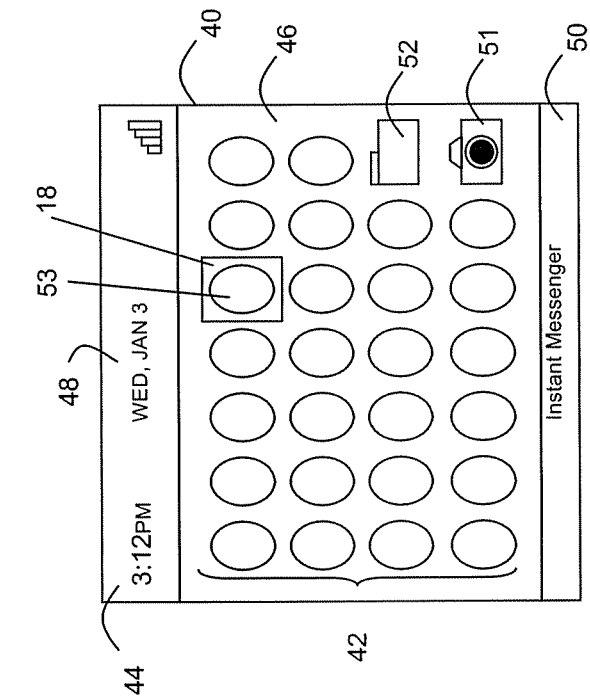
FIG. 7 is a screen shot of a home screen displayed by the mobile device.

Turning now to FIG. 7, the mobile device 100 may display a home screen 40, which can be set as the active screen when the mobile device 100 is powered up and may constitute the main ribbon application. The home screen 40 in this example embodiment generally includes a status region 44 and a theme background 46, which provides a graphical background for the display 12. The theme background 46 displays a series of icons 42 in a predefined arrangement on a graphical background. In some themes, the home screen 40 may limit the number icons 42 shown on the home screen 40 so as to not detract from the theme background 46, particularly where the background 46 is chosen for aesthetic reasons. The theme background 46 shown in FIG. 7 provides a grid of icons. It will be appreciated that typically several themes are available for the user to select and that any applicable arrangement may be used. An example icon shown in FIG. 7 is a camera icon 51 used to indicate a camera-based application such as a typical camera or video application for capturing images and video, or, as will be described below, a camera-based eye tracking search application 60 (see also FIG. 8). One or more of the series of icons 42 is typically a folder 52 that itself is capable of organizing any number of applications therewithin, as well as or instead of images, videos, data files, etc.

The status region 44 in this example embodiment includes a date/time display 48. The theme background 46, in addition to a graphical background and the series of icons 42, also includes a status bar 50. The status bar 50 provides information to the user based on the location of the selection cursor 18, e.g. by displaying a name for the icon 53 that is currently highlighted.

An application, such as message application 138 may be initiated (opened or viewed) from display 12 by highlighting a corresponding icon 53 using the positioning device 14 and providing a suitable user input to the mobile device 100. For example, message application 138 may be initiated by moving the positioning device 14 such that the icon 53 is highlighted by the selection box 18 as shown in FIG. 7, and providing a selection input, e.g. by pressing the trackball 14a.

Figure 8:
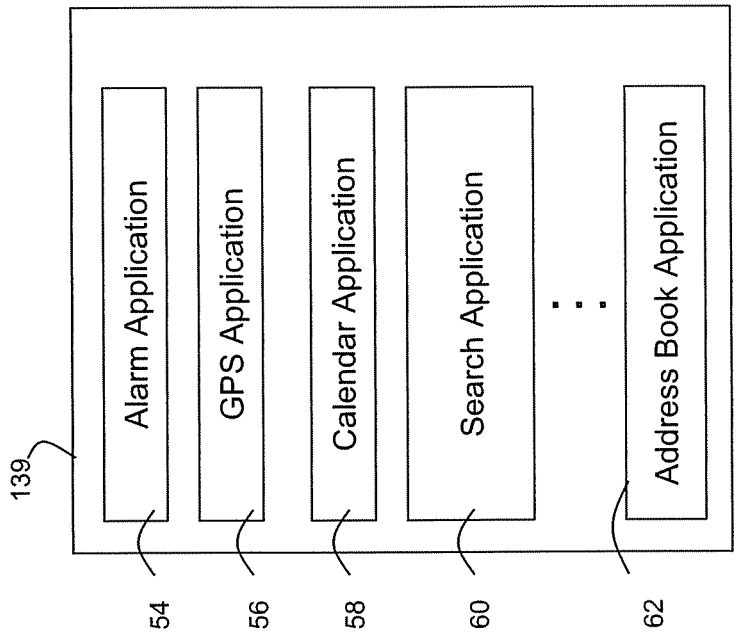
FIG. 8 is a block diagram illustrating examples of the other software applications and components shown in FIG. 7.

FIG. 8 shows an example of other software applications and components 139 that may be stored and used on the mobile device 100. Only examples are shown in FIG. 8 and such examples are not to be considered exhaustive. In this example embodiment, an alarm application 54 may be used to activate an alarm at a time and date determined by the user. There is also an address book 62 that manages and displays contact information. A GPS application 56 may be used to determine the location of a mobile device 100. A calendar application 58 that may be used to organize appointments. Another example application is a search application 60. As will be discussed below, the search application 60 may be operable to display a list of results 70 on a mobile device 100 based on the point of regard 8 of a user 2. It can be appreciated that the search application 60 may be a tool or sub-component of another application, may be a stand-alone application, or may represent a module or set of instructions operable to access a searching tool through a browser. As such, the search application 60 being shown as a separate module or component in FIG. 8 is for illustrative purposes only.

Figure 9:
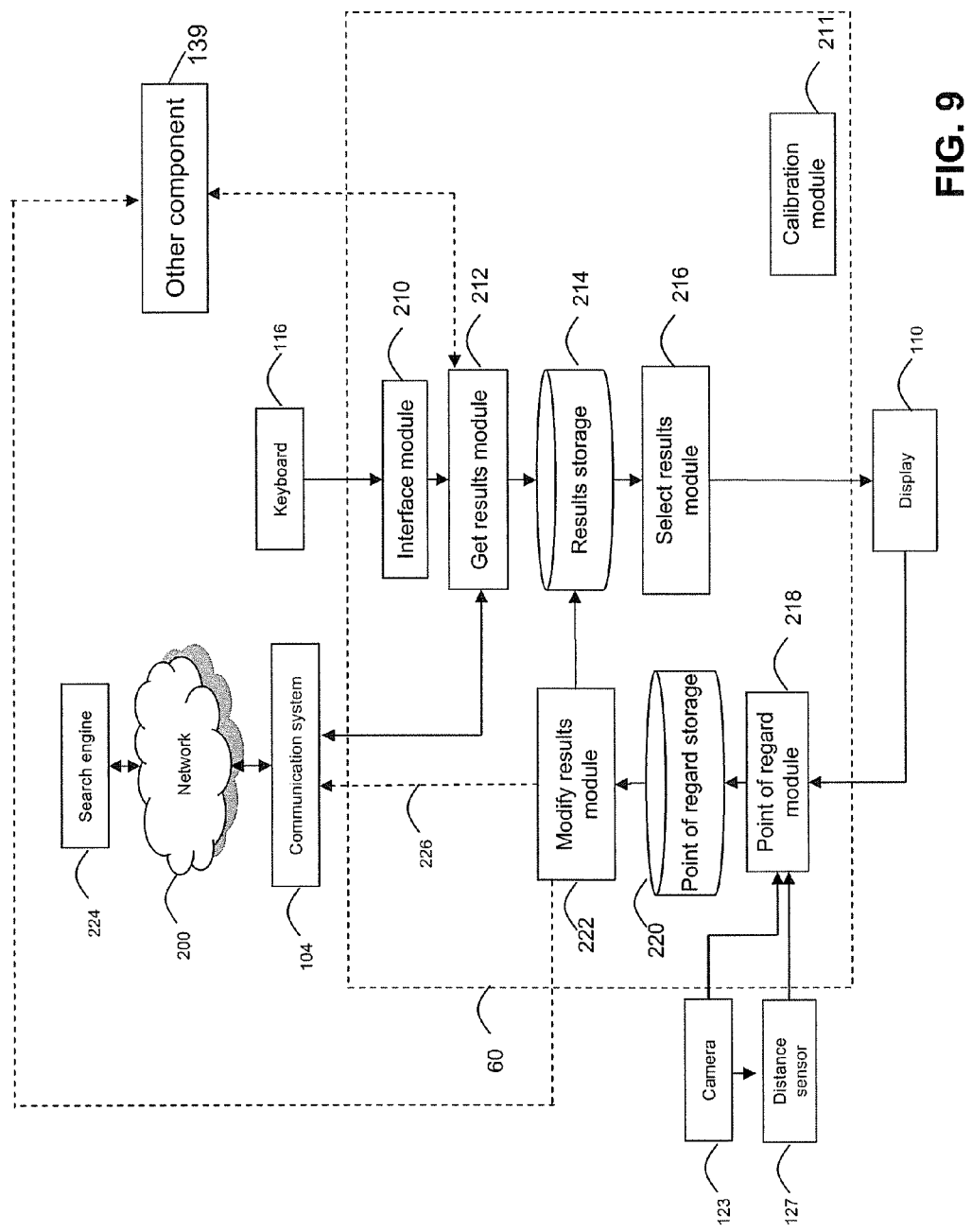
FIG. 9 is a block diagram of an example configuration of a search application.

Turning to FIG. 9, an example configuration of the search application 60 is provided. The search application 60 can receive search criteria from the keyboard 116 or other input devices such as touch-screen elements, buttons, etc. In this example embodiment, the search application 60 can also receive search results from a search engine 224 via the communication subsystem 104 connected to a network 200 (e.g. the internet). The search application 60 in this example embodiment also receives inputs from the distance sensor 127 and the camera 123. By obtaining such inputs, the camera 123 can obtain an image of the object (e.g. a user) as viewed or otherwise captured by the front camera lens 30, and then send the image to the search application 60. The distance sensor 127 in this example embodiment is operable to obtain or calculate the distance between the front camera lens 30 and the object viewed by the front camera lens 30, and then send the information to the search application 60. The search application 60 in this example embodiment also receives information from the display subsystem 110 regarding the contents shown and their respective locations on the display 12.

The search application 60 in this example embodiment includes an interface module 210 for generating a search command, a get results module 212 for obtaining search results, a results storage module 214 for storing search results and a select results module 216 for selecting a set of results to be shown on display 12. The search application 60 also includes, in this example embodiment, a point of regard module 218 for tracking the point of regard 8 of a user 2, a point of regard storage 220 for storing point of regard data, a modify results module for re-ordering the search results based on point of regard data and a calibration module 211 for calibrating the search application 60.

The interface module 210 receives search criteria from an input device such as the keyboard 116 and generates a search command based on the search criteria. In one example embodiment, the search command can instruct the get results module 212 to run a search using an internet-based search engine 224 via the communication subsystem 104 connected to a network 200 and to store the search results in the results storage 214. In another example embodiment, the search command can instruct the get results module 212 to run a search using a searching tool associated with an application on the mobile device 100 (not shown). For example, the get results module 212 can be used to search within another component 139 such as a message inbox or folder of images (as shown in dashed lines in FIG. 9). Therefore, it can be appreciated that although the present example embodiment illustrates the displaying of search results from a search engine 224, the principles are equally applicable to results obtained by searching function within any collection of objects on or associated with the mobile device 100 (e.g. messages, images, audio files, etc.). The get results module 212 receives and executes the search command and stores the search results in the results storage 216. The select results module 216 selects and retrieves a set of results from the results storage 214 and sends the set of results to the display subsystem 110 to be shown on the display 12.

It can be appreciated that use of the results storage 214 is only one example. In other example embodiments, the search results may be fed directly to the display via, for example a web page. In such example embodiments, storage of the results may occur at the search engine 224 or in another component in the network 200 and modification of those results may include requesting a refined search or a re-ordering of the results stored in such components. Whether or not the results need to be stored locally may depend on various factors such as to what extent the mobile device 100 is capable of communicating with the search engine 224 and/or what access it has to other components in the network 200. For example, if the mobile device 100 includes access to a server or storage capability in the network 200, it may be able to send instructions from the modify search results module 222 to such a server or storage module to have the results modified and returned. As such, the results storage 214 may or may not be required. In example embodiments wherein the search results are not stored locally, the modify results module 222, get results module 212, and select results module 216 may be combined into a single search interface module (not shown) that is operable to communicate with the search engine 224 and/or network component to run a search, obtain the results, instruct regarding modification, and obtain refined, filtered, or re-ordered results. It can also be appreciated that where the search application 60 is capable of modifying search results for both search results obtained remotely (e.g. from search engine 224) and those obtained locally (e.g. from folder, message box, etc.), the components shown in FIG. 9 may be configured to perform as described herein as well as instruct a remote component to store and modify results on their behalf.

The point of regard module 12 obtains an image from the camera 123 and the distance between the front camera lens 30 and the object captured in the image from the distance sensor 127. Using the image, the point of regard module 218 is able to detect a user 2 or subject, if one can be found in the captured image. Using the image and the distance reading, the point of regard module 218 is then able to calculate the point of regard 8 of the user 2 in the image. The point of regard module 218 also receives information from the display subsystem 110 regarding the contents shown on the display 12. Using this information from the display subsystem 110, the point of regard module 218 can map the point of regard 8 to a specific result 72 shown on the display 12. The point of regard data is stored in the point of regard storage 214.

The calibration module 211 can be used to enable the search application 60 to train itself for detecting subjects in the image and how they look in the image. For example, the search application 60 can initiate a training routine to have the user 2 look at and away from the display 12 while the mobile device 100 is held in different positions relative to the user 2 (e.g. held directly in front, to the left, right, above, below, etc.) in order to be able to calibrate how to detect the point of regard 8.

The modify results module 222 retrieves the point of regard data from the point of regard storage 220 and uses this information to re-order the upcoming results 76 that have not been shown on the display 12 or to re-order the entire set of results 70 including those that have already been displayed to effectively re-run and re-display the results 70. In this example embodiment, the modify results module 222 re-orders the upcoming results 76 stored in the results storage 214. In another example embodiment, as suggested above, the modify results module 222 can instruct the search engine 224 to re-order the upcoming results 76 (as shown by the dotted line 226) and to provide the get results module 212 with a re-ordered set of upcoming results 76.

It will be appreciated that any module or component exemplified herein that executes instructions or operations may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data, except transitory propagating signals per se. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the mobile device 100 or accessible or connectable thereto. Any application or module herein described may be implemented using computer readable/executable instructions or operations that may be stored or otherwise held by such computer readable media.

Figure 10:
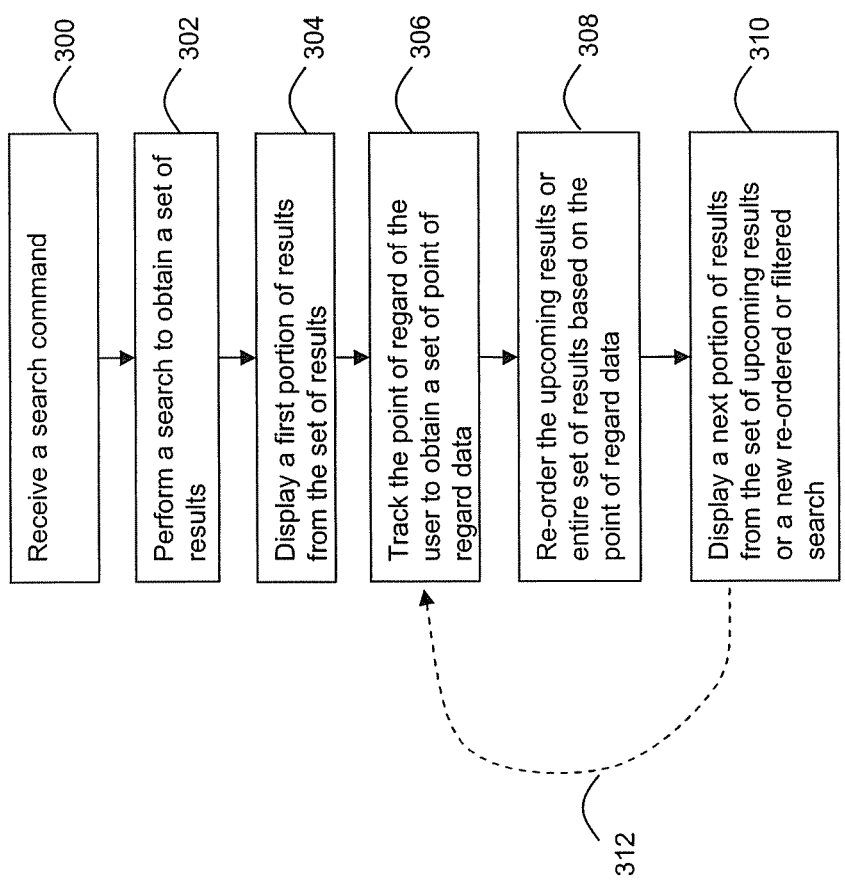
FIG. 10 is a flow diagram of example computer executable instructions for displaying search results based on a user's point of regard.

Turning to FIG. 10, example computer executable instructions are provided for displaying search results dynamically on a mobile device 100 using eye or head tracking. At block 300, a search command is received or otherwise obtained. At block 302, a search is performed in accordance with the search command to obtain a set of results 70. At block 304, a first portion of the results from the set of results 70 is shown on the display 12. At block 306, the point of regard 8 of the user 2 is tracked. At block 308, the upcoming results 76 are re-ordered based on the point of regard data. At block 310, a next portion of results from the upcoming results 76 is displayed. Blocks 306 to 310 are repeated (dotted line 312) to display more results 72 in the set of results 70.

As noted above, a search command is received or otherwise obtained at block 300. In the example configuration of the search application 60 shown in FIG. 9, the search command can be initiated by the interface module 210 based on the search criteria provided by the keyboard 116 or other input devices such as voice input, a captured image (i.e. to compare the image to images related to the body of results relevant to the search), or any other data that can be compared to a body of items that may be included in the search results 70. In one example embodiment, the interface module 210 can display a screen on the display 12 comprising a text field for which the user 2 can input a keyword or phrase to be searched. It can be appreciated that the interface module 210 can set other parameters of the search command such as the search tool to use (e.g. an internet-based search engine or a local search engine) and the scope of the search (e.g. the internet or locally stored files). The search command can depend on the search tools accessible by the mobile device 100. As noted above, other fields can be used to provide search criteria such as "browse" links to upload voice, images or other data, or "capture" links to begin recording voice inputs.

As noted above, at block 302, a search is performed in accordance with the search command to obtain a set of results 70. In the example configuration of FIG. 9, block 302 may be implemented by the get results module 212. In one example embodiment, the individual results 72 can include metadata that may help disambiguate the search results. For example, each result 72 of an image search using a internet-based search engine can include metadata such as a tag or text to describe the contents of each image. Other types of metadata can include the filename, date of creation, creator or owner, hosting website and words used in the proximity of the image on the hosting website (e.g. image captions), etc. In another example embodiment, the get results module 212 can add extra metadata to each result 72 based on information associated with the result 72. For the example of an image search, the get results module 212 can create metadata based on parsing the existing metadata, analyzing how the image is used on the hosting website and applying image processing techniques to determine the color, texture, shape or other properties of the image contents.

Additional parameters can be associated with each result 72 to differentiate between the results 72 and to facilitate the operations of the searching application 60. In one example embodiment, the get results module 212 can associate an interest level parameter for each result 72 to approximate the level of interest that the user 2 has for that result 72.

As noted above, at block 304, a first portion of results from the set of results 70 is shown on display 12. In the example configuration of FIG. 9, block 304 can be implemented by the select results module 216. In one example embodiment, the select results module 216 can select the results at the top of the set of results 70 and send these results to the display 12. The number of results 72 in the first portion of results 74 can be the number of results that can fit on the display 12. In this example embodiment, the first portion of results 74 presents the results in the original order as determined by the search engine 224 that provided the list of results 70 (or other search tool running locally on the mobile device 100). The search engine 224 may order the set of results 70 in descending level of relevancy to the search criteria. It has been recognized that this determination of relevancy by the search engine 224 may not coincide with the actual level of interest of the user 2 in a result 72.

It can be appreciated that the first portion of results from the set of results 70 can be selected in many different ways other than selecting the results at the top of the set. For example, the first portion of results 74 can be randomly selected from the set of results 70. In another example embodiment, the first portion of results 74 can be selected by choosing the results that differ the most (based on analyzing the metadata) in order to convey the scope and breadth of the set of results 70.

As noted above, at block 306, the point of regard 8 of the user 2 is tracked while a portion of the set of results is shown on the display 12. In the example configuration of FIG. 9, block 306 can be implemented by the point of regard module 218. In one example embodiment, the point of regard module 218 repeatedly determines the point of regard 8 of the user 2 over the period of time that the portion of the set of results is shown on the display 12 and stores the point of regard data in the point of regard storage 220. In other example embodiments, the point of regard module 218 can determine the point of regard 8 based on other criteria such as a predetermined amount of time (i.e. regardless of how many portions of the results 70—e.g. scrolling—takes place).

At block 308, the upcoming results 76 or the entire set of results may then be re-ordered based on the point of regard data. In the example configuration of FIG. 9, block 308 can be implemented by the modify results module 222. In one example embodiment, the modify results module 222 can directly access the upcoming results 76 in the results storage 214 to re-order the upcoming results 76. It can be appreciated that as suggested, the modify results module 222 can instead re-order or filter the entire set of results 70 and display a new first portion of the set of results 70 showing the re-ordering and/or filtering. This can be advantageous, for example, if results 70 from the first portion 74 of the results 70 contains items that may be of interest to the user but were overlooked during their first review.

At block 310, a next portion of results from the upcoming results is displayed or the entire set of results 70 is re-displayed in a re-ordered or filtered manner. In the example configuration of FIG. 9, block 310 can be implemented by the select results module 216. In one example embodiment, the select results module 216 can select the results at the top of the upcoming results 76 and send these results to the display 12. The number of results in the next set of results can be the number of results that can fit on the display 12. In this example embodiment, the next portion of results presents the results 72 in the order of descending level of interest of the user 2 as inferred by the search application 60. It can be appreciated that the next portion of results from the upcoming results 76 can be selected in many different ways other than selecting the results at the top of the set of upcoming results 76. For example, the next portion of results can select results at equal intervals spanning the entire list of upcoming results 76 to capture the breadth of the set of upcoming results 76. In another example embodiment, the next portion of results can concentrate on the results at the top of the upcoming results 76 and include fewer results as they are located farther down the set. Similar principles may apply when re-ordering or filtering and re-displaying the entire set of results 70 or if a new search is requested with refined search criteria.

As noted above and shown by the dotted line 312, the blocks 306 to 310 can be repeated to continually refine the search results or to repeat the process for each next portion of the upcoming results 76. In one example embodiment, the upcoming results 76 may be re-ordered after each next set of results from the upcoming results 76 is displayed. Each next set of results that is shown on the display 12 may then be removed from the upcoming results 76. It may be noted however that in other example embodiments, after tracking the user for a certain amount of time or for a certain amount of scrolling or browsing, a request for a new search may be made to the search engine 224, a new search may be performed locally (if applicable), or the results temporarily stored in the results storage 214 may be re-ordered or filtered and re-displayed in a new order based on the data obtained by the point of regard module 218. Therefore, the modify search results module 222 can modify the search or have the search modified in various ways and the example embodiments herein described are for illustrative purposes only.

In the above example embodiments, the search application 60 receives the complete set of results 70 and performs operations on the set of results 70 such as re-ordering the upcoming results 76. In other example embodiments, the search application 60 can direct the search engine 224 or a network component (not shown) to perform operations on the set of results 70 and to either re-send modified results or may be operable to send only the results that are to be immediately displayed by the mobile device 100 to the search application 60 (e.g. if instructed to re-order each portion of the upcoming results 76 at a time).

An example method of determining the point of regard 8 of the user 2 at block 306 will now be provided. In one example embodiment, block 306 can be implemented by using eye tracking algorithms or analytics (i.e. a routine or set of instructions for tracking the gaze direction 6 of the user's eyes 4), in order to calculate the point of regard 8.

By way of background, the concept of eye tracking is well known and a number of different techniques have been developed for accomplishing eye tracking. A commonly used technique is based on so-called pupil center corneal reflection (PCCR) methods. PCCR methods typically involve using a camera device 31 to capture an image of a user 2 while the user 2 is being illuminated by the light source 32. It has been found that PCCR methods may work optimally when using an infrared light source 32, however, the principles may be applied using visible light sources 32. The light source 32 illuminates the user's eyes 4 and the illumination causes highly visible reflections of the light in parts of the user's eyes 4. A fraction of the light enters the pupil and is reflected off the retina to identify the pupils of the eyes 4. A fraction of the light is reflected off the cornea of the eyes 4, the reflection often referred to as a "glint". Using known image processing techniques, the centers of the pupil and the glint are identified and a vector from the center of the glint to the center of the pupil is calculated. The direction of this vector provides gaze direction information which is used with the distance between the camera device 31 and the user's eyes 4 to calculate the point of regard 8 using known methods.

Figure 11:
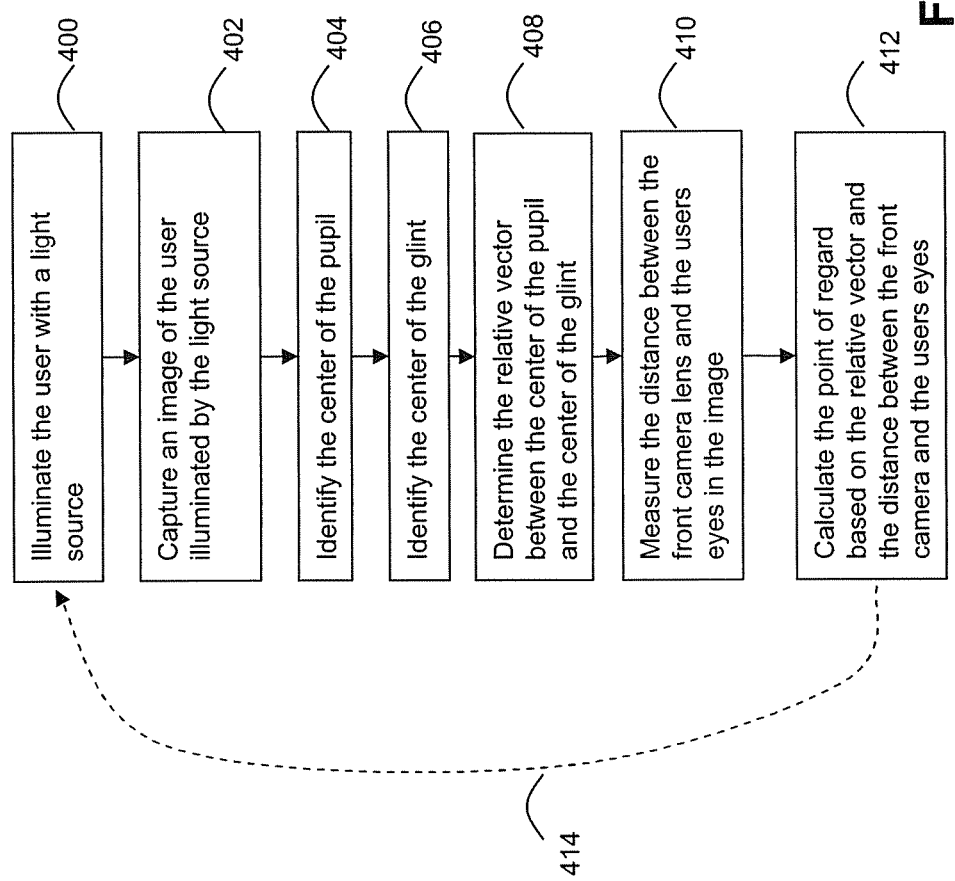
FIG. 11 is a flow diagram of an example process for tracking a point of regard by eye tracking.

FIG. 11 shows a flow diagram of an example PCCR method to determine the point of regard based on eye tracking using the mobile device 100. It can be appreciated that the following description of the eye tracking operations is for illustrative purposes and that other methods of eye tracking are equally applicable to the principles discussed herein. At block 400, the user is illuminated by the light source 32. At block 402, an image of the user 2 illuminated by the light source 32 is captured by the front camera lens 30.

At block 404 and 406, the center of the pupil and the center of the glint are identified, respectively. The relative vector between the center of the pupil and the center of the glint is then determined at block 408.

At block 410, the distance between the front camera lens 30 and the user's eyes 4 in the image is measured. The devices and methods of determining the distance between an object and a camera are known and can be used here. Examples of distance sensing devices include a camera, infrared optics, and an ultrasonic transmitter and receiver. Different combinations of distance sensing devices can also be used, and known methods associated with the devices for finding the distance between an object and a camera device 31 are applicable. In the example embodiment of FIG. 3, distance from the front camera lens 30 to an object is measured by a distance sensor 34 placed adjacent to the front camera lens 30. Although the distance sensor 34 is illustrated as a separate component in FIG. 3, the distance sensor 34 can be incorporated into other components of the mobile device 100. For example, a distance sensor based on infrared light can be incorporated into an infrared light source 32 also used to illuminate the user 2 when an image is captured.

At block 412, the point of regard 8 of the user 2 is calculated based on known methods using the relative vector and the distance between the front camera lens 30 and the user's eyes 4.

As shown by the dotted line 414, the blocks 400 to 412 can be repeated to track the point of regard of the user 2 over a period of time.

It can be appreciated that the principles discussed herein may also be implemented using head tracking instead of or in addition to eye tracking. For example, an electronic device having a large display which displays items relatively far apart may be capable of tracking a face or head of a subject. As such, the example embodiments utilizing eye tracking are only for illustrative purposes and are particularly advantageous for use when implementing these principles on a mobile device 100.

Figure 12:
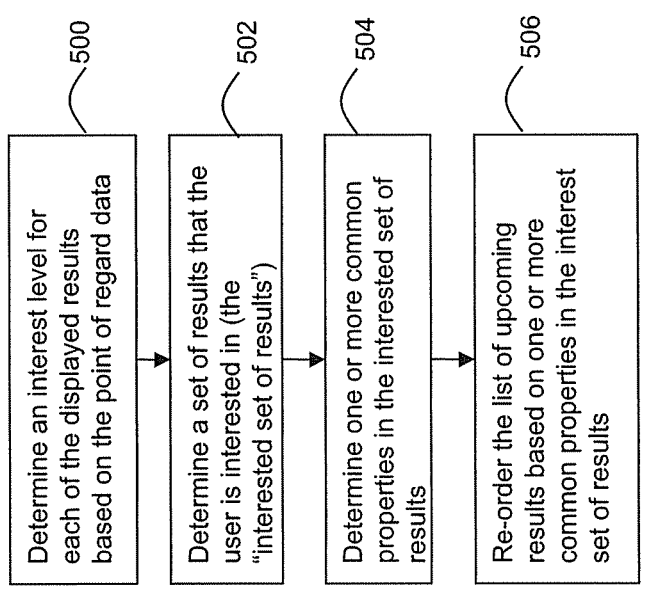
FIG. 12 is a flow diagram of an example process for re-ordering the list of upcoming results.

FIG. 12 shows a flow diagram of an example method of re-ordering the upcoming results 76 or the set of results 70 as shown in block 308 of FIG. 10. At block 500, an interest level for each of the displayed results 74 is determined based on the point of regard data of the user 2. The point of regard data can be used to set an interest level parameter associated with each of the displayed results 74 to indicate the level of interest that the user 2 has in that individual result 72. In one example embodiment, longer periods of time where the point of regard 8 of the user 2 falls on or near the area of the display 12 where a result 72 is displayed may be used to infer a higher level of interest of the user 2 with respect to that result 72. In another example embodiment, the level of interest that a user 2 has in a result 72 can also incorporate the number of times that the point of regard 8 of the user 2 returns to a result 72. It can be appreciated that other methods incorporating the point of regard data can be used to infer the interest level of the user 2 in a result 72. For example, the point of regard 8 in combination with some other indicator such as whether or not the user has performed a mouse-over or pointing action towards the result 72, or whether or not the user has selected the individual result 72 could be used to determine the level of interest. In another example embodiment, the point of regard 8 in combination with a voice input (received at a microphone of the electronic device) such as "Show me more of that" while looking at a particular result 72 could be used to refine and/or re-order the search results 70.

At block 502, a set of results that the user 2 is interested in is determined (called the "interested set of results"). In one example embodiment, the interested set of results can include the results from the displayed results 74 that have an interest level parameter above a certain threshold value. In another example embodiment, the interest set of results can include the results from the displayed results 74 that have an interest level parameter above a certain percentile. In yet another example embodiment, the interest set of results can be selected from both the displayed results 74 and previous displayed results 78. It can be appreciated that other methods of incorporating the displayed results 74, previous displayed results 78 or both can be used.

Figure 18:
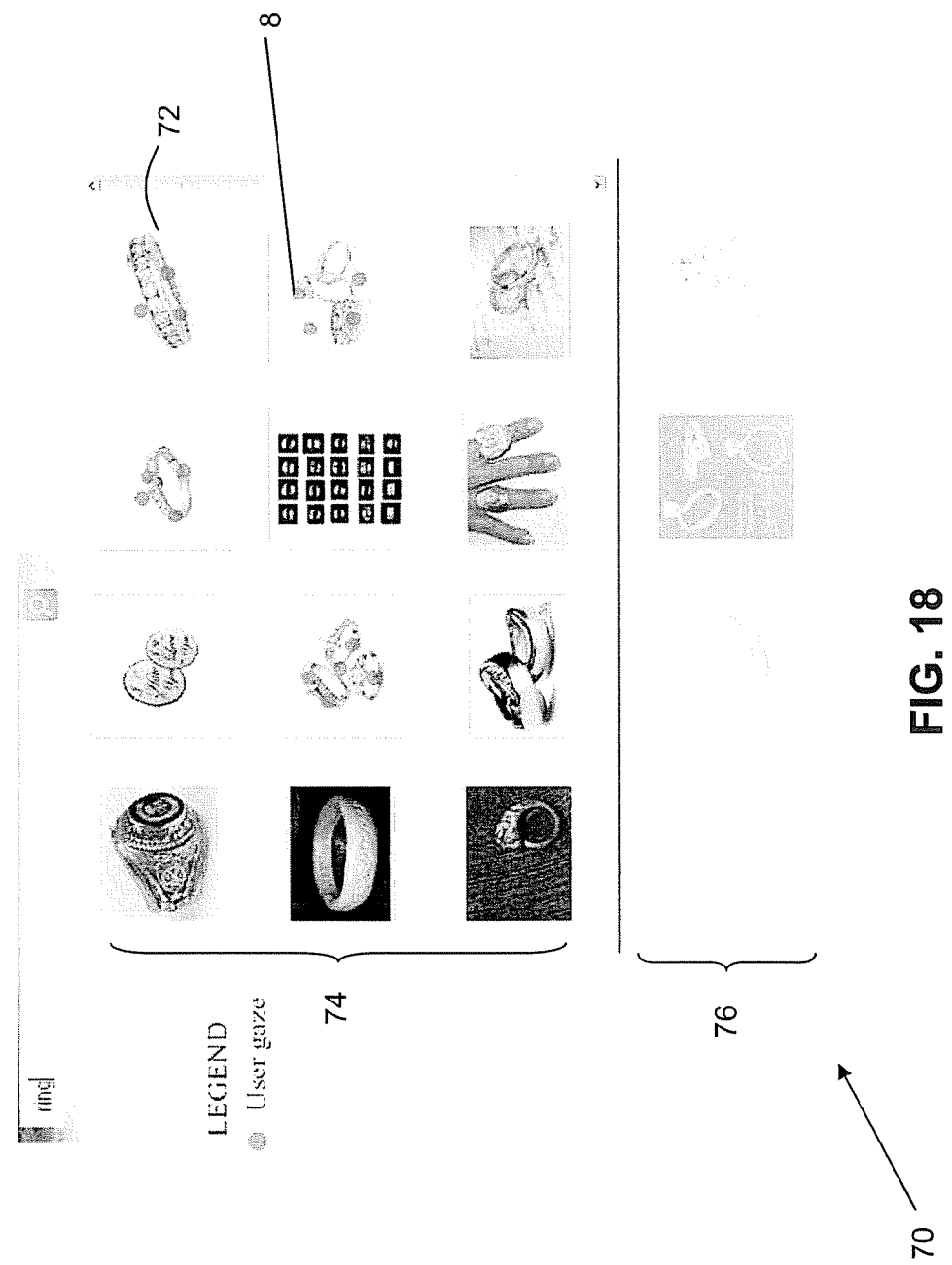
FIG. 18 is a screen shot of an example set of image search results.

At block 504, one or more common properties among the results in the interested set of results are determined. In one example embodiment, one or more similarities in the metadata associated with each result in the interested set can be used to determine the common properties. For example, metadata for each search results in the interested set may have one or more common keywords. Such keywords can then be used to filter out the upcoming results 76 or be used to re-order the results 70 in a new search. FIG. 18 illustrates an example wherein an original image search query for "ring" was conducted. It is found, however, that the user's gaze indicates that the user is most interested in engagement rings (e.g. the metadata for that image, file name, or other property of the image indicates "engagement" ring). The search results 70 may then be modified to be biased towards or otherwise filter using the more refined search query "engagement rings". It can be appreciated that there can be one or more common properties, and that the degree of commonality can differ between the properties. For example, if keywords are compared, the same keyword, character for character, can be imposed or similar keywords to account for spelling errors, spelling types (e.g. British versus American spelling), plurals, etc.

In another example embodiment, common properties of what is displayed to represent the search results themselves can be used to correlate similar results. In the example of FIG. 18, in addition to determining that the points of regard 8 correspond to particular results, image processing techniques could be applied to detect similarities in the images. For example, image processing can be used to detect the shape of an object in the image to differentiate rings that are worn on a finger from images related to a "ringing" sound (e.g. ring tone, door bell, etc.). This may be particularly advantageous wherein the search results 70 include both textual and image based results 72.

At block 506, the list of upcoming results 76 or the set of results 70 is re-ordered based on the common properties of the interested set of results. In one example embodiment, the list of upcoming results is re-ordered in descending level of similarity to one or more common properties of the interested set of results. It can be appreciated that there are many applicable methods of using the one or more common properties to evaluate the level of similarity and that the common properties may be weighted differently to signify the importance of one common property over another.

Figure 13:
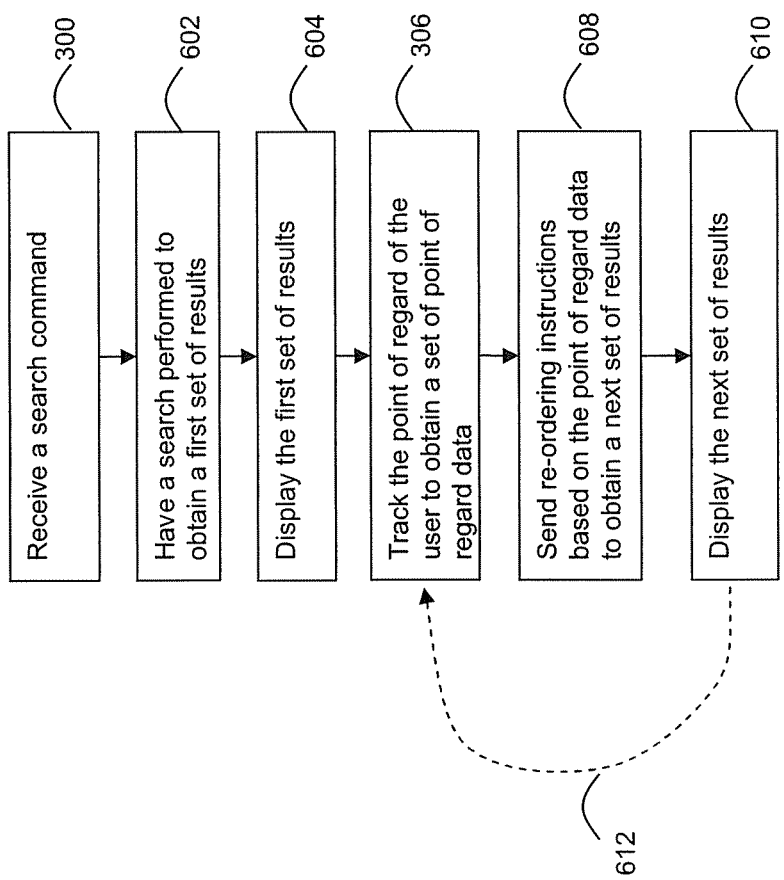
FIG. 13 is a flow diagram of another example of computer executable instructions for displaying search results based on a user's point of regard.

Turning to FIG. 13, an example set of computer executable instructions is provided for displaying search results dynamically on a mobile device 100 by instructing a re-ordering of the results as noted above. At block 300, a search command is received or otherwise obtained, similar to what is shown in FIG. 10. At block 602, a search is performed in accordance to the search command to obtain a first set of results. At block 604, the first set of results is shown on the display 12. At block 306, the point of regard 8 of the user 2 is tracked. At block 608, re-ordering instructions based on the point of regard data is sent, e.g. to the search engine 224 to obtain a next set of results. At block 610, the next set of results is shown on the display 12. Blocks 306, 608 and 610 are repeated (dotted line 612) to display more results.

As noted above, at block 608, re-ordering instructions may be sent to the search engine 224. In the example configuration of FIG. 9, block 608 can be implemented by the modify results module 222. In one example embodiment, the modify results module 222 can communicate with the search engine 224 via the communication system 104 (as shown by the dotted line 226) connected to the network 200. It can be appreciated that the operations shown in FIG. 13 may be equally applied to a request to re-order a search that has been performed locally on the mobile device 100.

Figure 14:
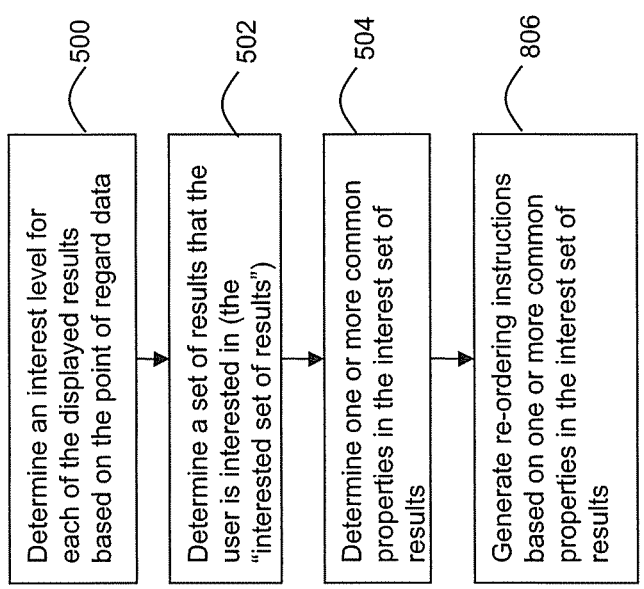
FIG. 14 is a flow diagram of an example method for generating re-ordering instructions.

FIG. 14 shows a flow diagram of an example method of generating re-ordering instructions. At block 500, an interest level for each of the displayed results 74 is determined based on the point of regard data of the user 2. At block 502, a set of results that the user 2 is interested in is determined (called the "interest set of results"). At block 504, one or more common properties among the results in the interest set of results are determined. At block 806, re-ordering instructions based on the common properties of the interested set of results are generated. In one example embodiment, the re-ordering instructions can instruct the search engine 224 to re-order the list of upcoming results 76 (stored on the servers of the search engine 224) in descending level of similarity to one or more common properties of the interest set of results. In other example embodiments, the re-ordering instructions can be used locally or be provided to a remote entity such as a network component that temporarily stores or caches the results for the mobile device 100.

In the above example embodiments, the search engine 224 is an internet-based search engine accessible by the mobile device 100 via the communication subsystem 104 connected to the network 200. In other example embodiments, the search engine 224 can be located directly on the mobile device 100 as a search engine subsystem (not shown in FIG. 6). In yet other example embodiments, the search engine 224 can be accessible via the communication subsystem 104 connected to a server (not shown) that is connected to the network 200. It can be appreciated that any method to access a search engine by the mobile device 100 can be used and that the list of results 70 can be stored at any intermediary between the search engine 224 and the mobile device 100.

In the above example embodiments, the search application 60 re-orders or has re-ordered, the upcoming results 76 based on the point of regard data by either performing the re-ordering operation or providing re-ordering instructions. As discussed above, in other example embodiments, the search application 60 can instead perform a new search based on the point of regard data by either itself performing the new search or instructing a search engine to do so. In other example embodiments, the set of results 70 originally obtained can themselves be re-ordered or filtered rather than performing an entirely new search.

Figure 15:
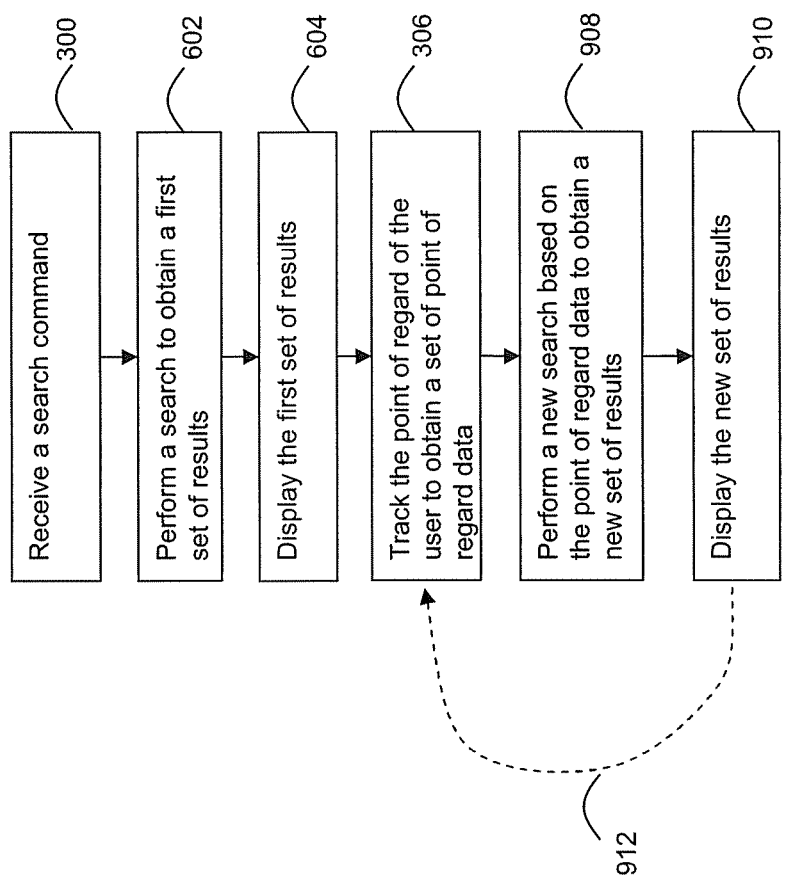
FIG. 15 is a flow diagram of yet another example of computer executable instructions for displaying search results based on a user's point of regard.

Turning to FIG. 15, another example of computer executable instructions are provided for displaying search results dynamically on a mobile device 100 using eye tracking. At block 300, a search command is received or otherwise obtained. At block 602, a search is performed based on the search command to obtain a first set of results. At block 604, the first set of results is shown on the display 12. At block 306, the point of regard 8 of the user 2 is tracked. At block 908, a new search is performed based on the point of regard data to obtain a new set of results. At block 910, the new set of results is displayed. Blocks 306, 908 and 910 are repeated (dotted line 912) until the user 2 ends the search.

Figure 16:
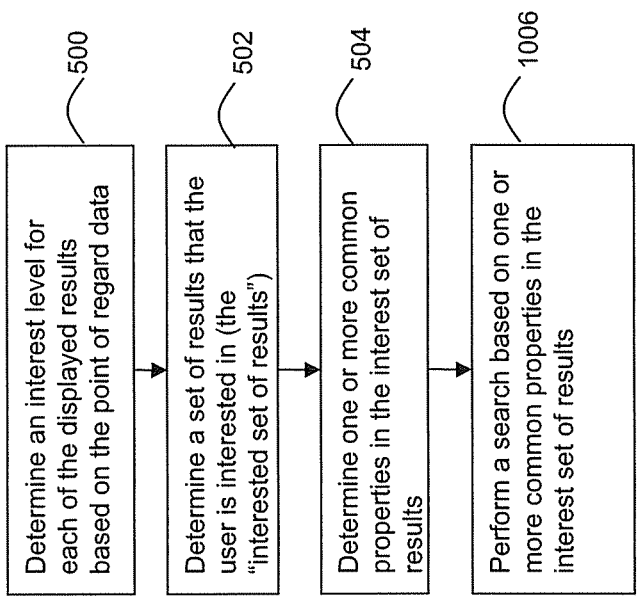
FIG. 16 is a flow diagram of an example method for performing a new search.

FIG. 16 shows a flow diagram of an example method of performing a new search based on the point of regard data. At block 500, an interest level for each of the displayed results 74 is determined based on the point of regard data of the user 2. At block 502, a set of results that the user 2 is interested in is determined (also referred to as the "interested set of results"). At block 504, one or more common properties among the results in the interested set of results are determined. At block 1006, a search is performed based on the common properties of the interested set of results. In one example embodiment, the search criteria for the new search can be the original search criteria added with a keyword or phrase describing one or more common properties of the interested set of results. It can be appreciated that the principles discussed regarding having the search application 60 re-order the upcoming results 76 are equally applicable to performing a new search.

Figure 17:
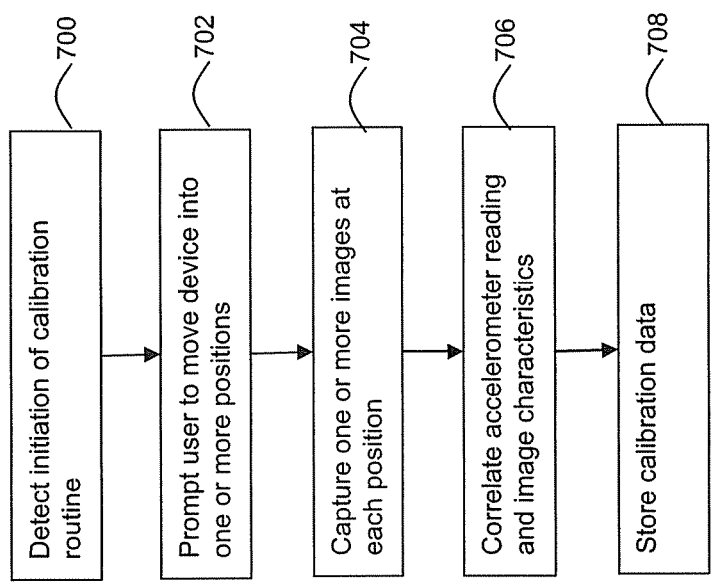
FIG. 17 is a flow diagram of example computer executable instructions for implementing a training routine.

As discussed above, the calibration module 211 can be used to initiate a training routine to train the search application 60. FIG. 17 illustrates an example set of computer executable instructions for implementing an example training routine. At 700, the calibration module 211 detects initiation of the calibration routine. For example, the mobile device 100 may perform periodic calibrations, a user may select an option from a menu (not shown), or an application may make such a request, e.g. based on quality factors or other criteria. At 702, the calibration module 211 enables a prompt to be displayed (not shown) that instructs the user to move the mobile device 100 into different positions with respect to their face/eyes. For example, the prompt may step through a series of positions asking the user 2 to hold the positions until one or more images has been taken. Any number of distinct positions can be used. At 704, one or more images can be captured at each position. For example, an image can be captured while the user 2 is looking directly at the display 12 and another while the user 2 is looking away from the display 12 from the same position. From the images captured, various characteristics can be determined such as what shape the face/eyes take when viewed from the particular position corresponding to that image. The accelerometer 125 may also have a particular reading that can be correlated with the image characteristics at 706. The calibration data may then be stored at 708. The calibration data can be used to enable the search application 60 to operate more efficiently. For example, if the search application 60 would obtain a false negative due to the subject taking a particular shape in a particular position but during training it is determined that when the user tilts the mobile device 100 in a particular way they appear in the form of the particular shape when an image is taken, such false negatives can be avoided.

It will be appreciated that the example embodiments and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the spirit of the invention or inventions. For instance, the steps may be performed in a differing order, or steps may be added, deleted, or modified.

Although the above has been described with reference to certain specific example embodiments, various modifications thereof will be apparent to those skilled in the art as outlined in the appended claims.

The invention claimed is:

1. A method of displaying search results on an electronic device, the method comprising:
   performing a search based on search criteria to return a first set of search results, the number of which is greater than the number of results that can be shown on a display of the electronic device;
   selecting a first portion of results from the first set of search results capable of being displayed on the display, the results within the first portion differing most from one another within the first set of search results;
   first displaying the first portion of results;
   capturing an image using a camera device of the electronic device, the camera device being directed in a same direction as the display of the electronic device, the image including a subject;
   determining at least one point of regard in the image, the at least one point of regard indicating at least one result in the first portion at which a gaze of the subject is directed; and
   second displaying further search results of the first set of search results based on information associated with the at least one result.

2. The method according to claim 1, further comprising:
   performing a new search based on refined search criteria to return a second set of search results; and
   repeating the first displaying, capturing, determining and second displaying operations on the second set of search results.

3. The method according to claim 1, wherein determining the at least one result associated with the at least one point of regard comprises determining at least one point of regard which at least partially overlaps at least one result as it appears on the display.

4. The method according to claim 1, wherein the first set of search results and the further search results are obtained from a search engine remote to the electronic device.

5. The method according to claim 1, wherein the first set of search results and the further search results are obtained from items stored locally on the electronic device.

6. The method according to claim 5, wherein the items comprise any one or more of the following: data files, messages, images, audio files, video files, and contacts.

7. The method according to claim 1, wherein the information associated with the at least one result comprises metadata indicative of one or more common properties of the at least one result to enable other search results to be correlated thereto.

8. The method according to claim 1, wherein the further search results comprise a filtered set of results obtained from the first set of search results.

9. The method according to claim 1, wherein the further search results comprise a re-ordering of the first set of search results.

10. A computer readable storage medium comprising computer executable instructions for displaying search results on an electronic device, the computer executable instructions comprising instructions for:
    performing a search based on search criteria to return a first set of search results, the number of which is greater than the number of results that can be shown on a display of the electronic device;
    selecting a first portion of results from the first set of search results capable of being displayed on the display, the results within the first portion differing most from one another within the first set of search results;
    first displaying the first portion of results;
    capturing an image using a camera device of the electronic device, the camera device being directed in a same direction as the display of the electronic device, the image including a subject;
    determining at least one point of regard in the image, the at least one point of regard indicating at least one result in the first portion at which a gaze of the subject is directed; and
    second displaying further search results of the first set of search results based on information associated with the at least one result.

11. An electronic device comprising a processor, memory, a display, and a camera device, the memory comprising computer executable instructions for causing the processor to display search results on the display, the computer executable instructions comprising instructions for:
    performing a search based on search criteria to return a first set of search results, the number of which is greater than the number of results that can be shown on the display;
    selecting a first portion of results from the first set of search results capable of being displayed on the display, the results within the first portion differing most from one another within the first set of search results;

first displaying the first portion of results;
capturing an image using the camera device, the camera device being directed in a same direction as the display, the image including a subject;
determining at least one point of regard in the image, the at least one point of regard indicating at least one result in the first portion at which a gaze of the subject is directed; and
second displaying further search results of the first set of search results based on information associated with the at least one result.

12. The electronic device according to claim 11, wherein the computer executable instructions further comprise instructions for:
performing a new search based on refined search criteria to return a second set of search results: and
repeating the first displaying, capturing, determining and second displaying operations on the second set of search results.

13. The electronic device according to claim 11, wherein determining the at least one result associated with the at least one point of regard comprises determining at least one point of regard which at least partially overlaps at least one result as it appears on the display.

14. The electronic device according to claim 11, wherein the first set of search results and the further search results are obtained from a search engine remote to the electronic device.

15. The electronic device according to claim 11, wherein the first set of search results and the further search results are obtained from items stored locally on the electronic device.

16. The electronic device according to claim 11, wherein the information associated with the at least one result comprises metadata indicative of one or more common properties of the at least one result to enable other search results to be correlated thereto.

17. The electronic device according to claim 11, wherein the further search results comprise a filtered set of results obtained from the first set of search results.

18. The electronic device according to claim 11, wherein the further search results comprise a re-ordering of the first set of search results.

* * * * *